March 24, 1970   W. F. GERDES ET AL   3,502,965

CONTROL APPARATUS AND SYSTEM

Filed March 4, 1966

INVENTORS.
Walter F. Gerdes
Hogan A. Randle
BY
Earl D. Ayers
AGENT

United States Patent Office 3,502,965
Patented Mar. 24, 1970

3,502,965
CONTROL APPARATUS AND SYSTEM
Walter F. Gerdes, Lake Jackson, and Hogan A. Randle, Angleton, Tex., assignors to The Dow Chemical Company, Midland, Mich., a corporation of Delaware
Continuation-in-part of abandoned application Ser. No. 315,567, Oct. 11, 1963. This application Mar. 4, 1966, Ser. No. 536,542
Int. Cl. G01r *5/28;* G01n *27/00;* G05d *11/13*
U.S. Cl. 324—32
8 Claims

ABSTRACT OF THE DISCLOSURE

This invention relates to apparatus wherein a sample stream taken from a process stream or sample reservoir is passed through a capillary having electrically insulating walls, the capillary having reversible spaced apart electrodes, an electrode being at or near each of its ends, either continuously of for a predetermined time. As the sample stream passes through the capilliary (or capillary substitute) a measurement of the electrical signal developed across the electrode is made by means of a meter of suitable impedance which is coupled across said electrodes. The signal developed is a function of the charge condition in the sample stream.

---

Figure 1:
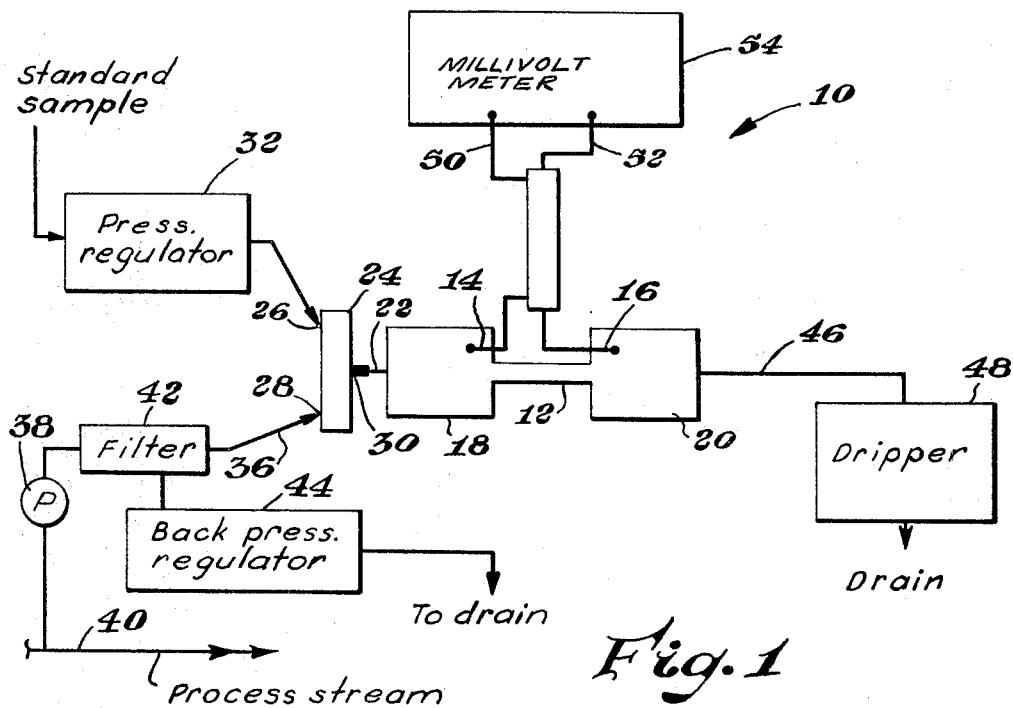

This application is a continuation-in-part of our co-pending application Ser. No. 315,567, now abandoned, filed Oct. 11, 1963 for Control Apparatus and System.

This invention relates to novel apparatus for developing an electrical signal which can be utilized in the continuous regulation of flocculation of aqueous suspensions of finely divided charge solid particles and for other uses.

It is conventional practice in clarifying aqueous systems containing suspended particles to employ a flocculation operation. Once flocculated, the suspended particles can be separated from their water medium by sedimentation, filtration, flotation, centrifugation, or one or more of the foregoing physical separatory processes in combination. Conventionally, the flocculation operation is promoted by the use of flocculating chemicals such as alum, ferric chloride or various polymeric materials such as water-soluble cationic and anionic organic polyelectrolytes. Aqueous suspensions of finely divided particles are encountered in natural or raw water supplies such as rivers and lakes and in municipal and industrial wastes, which latter systems include a substantial proportion of suspended organic particles.

In a typical flocculation process for the clarification of municipal sewage, a waster-soluble cationic flocculating chemical is added to the sewage. The sewage normally comprises suspended negatively charged organic particles and thus the addition of the cationic agent results in charge neutralization on the suspended particles. When the average charge is zero, or approaching zero, the dispersed organic particles undergo flocculation, i.e., aggregation, at an optimum rate. Too much cationic agent, however, creates positively charged organic particles which can be as difficult to flocculate as are the originally negatively charged particles.

To date, however, determining how much chemical to add to the stream to be treated has been difficult, especially since the composition of such streams often varies over fairly wide ranges in time intervals of a few minutes to a few hours.

Various empirical approaches to "finding" the correct dosage of flocculant to be added to a stream have been used. For example, increasing amounts of flocculant may be added to samples from the stream and the amount of decrease in turbidity of the stream noted, the correct dosage being determined as the one which causes the greatest decrease in turbidity with the least addition of flocculant. Such a procedure is time consuming and therefore not really suitable where the composition of the treated stream varies.

Another approach is to use a so-called Zeta meter to determine the charge condition existing in the stream. The Zeta meter is used to observe the time required for a charge particle from the stream to pass a predetermined distance along a liquid path while under the influence of an electric field. This method is time consuming and requires a technician to perform the test and to interpret test results before the stream is treated with a greater, lesser, or the same amount of flocculant as had been used since the last previous Zeta meter test was made.

The usual methods of determining the dosage of flocculant to be added to a stream having suspended charged particles therein are discontinuous and require a substantial amount of individual labor in making the tests. The use of such tests in controlling flocculation of such streams is costly both from the standpoint of the labor involved and from the fact that the amount of flocculant actually required by the stream may vary from that indicated by the tests.

Accordingly, a principal object of this invention is to provide an improved instrument which is useful in controlling the dosage of chemicals to be added to a controllable steam having a charged condition existing therein.

Another object of this invention is to provide an improved apparatus for use in metering the addition of flocculant to a stream having dispersed charged particles therein.

A further object of this invention is to provide an improved instrument which is capable of developing, on a continuous basis, an electrical signal which is a function of the charge condition existing in a stream containing charged particles therein.

In accordance with this invention, there is provided apparatus wherein a sample stream taken from a process stream or sample reservoir is passed through a capillary having electrically insulating walls, the capillary having reversible spaced apart electrodes, an electrode being at or near each of its ends, either continuously or for a predetermined time. As the sample stream passes through the capillary (or capillary substitute) a measurement of the electrical signal developed across the electrode is made by means of a meter of suitable impedance which is coupled across said electrodes. The signal developed is a function of the charge condition in the sample stream.

Figure 2:
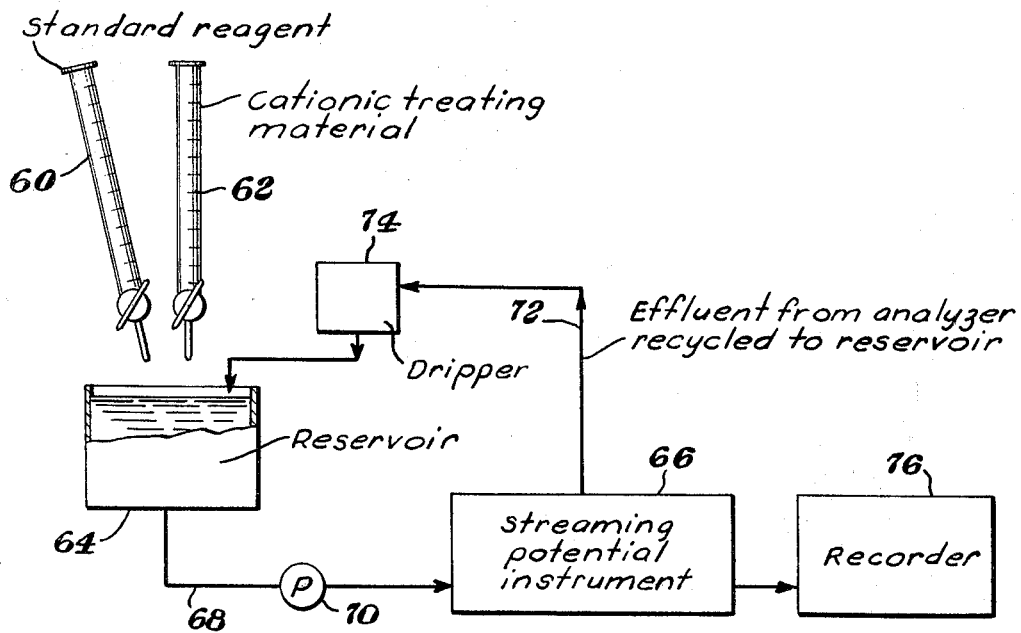

The invention, as well as additional objects and advantages thereof, will best be understood when the following detailed description is read in connection with the accompanying drawings, in which:

FIG. 1 is a diagrammatic view of an instrument made in accordance with this invention, and FIG. 2 is a diagrammatic view showing the instrument of FIG. 1 used in a titration operation.

Referring to the drawing, there is shown signal generating apparatus, indicated generally by the numeral 10, in accordance with this invention.

The apparatus 10 comprises a capillary 12 having electrically insulating walls and having reversible electrodes 14, 16 (silver, silver chloride, for example) disposed at spaced-apart locations along or at the ends of the capillary and in the path of any stream flowed through the capillary.

As shown, the electrode 14 is at or near the input end, 18, of the capillary and the electrode 16 is at or near to the output end 20 of the capillary 12.

A conduit or tube 22, coupled to a distributing valve 24 at one end, has its other end coupled to the input end 18 of the capillary. The distributing valve 24 has two inputs 26, 28 and an output 30. The input 26 is coupled to a source of standard sample which provides a sample stream at a predetermined pressure which is achieved by passing the standard sample stream through a suitable pressure regulator 32, for example.

The input 28 is coupled to a sample stream line 36 through which is pumped a sample stream at a predetermined pressure. A pump 38 is coupled to a process stream 40 or other source of material to be sampled. The output of the pump is passed through a filter (usually a 30 or 60 micron filter) 42. A back pressure regulator 44 is coupled to the filter on the input side thereof to assure that a constant pressure is applied to the filter input, the excess of sample usually going to a drain.

The output end 20 of the capillary 12 is coupled to a discharge line 46 which is coupled into a dripper device 48 which serves to break up the output stream from the capillary into discrete droplets before the stream is fed into a drain line, for example, or otherwise disposed of.

The electrodes 14, 16 are coupled by coaxial leads 50, 52 to the terminals of a pH Dynalog type of potential indicating meter or suitable millivolt meter 54 which has an imput impedance of the order of 30 megohms. The electrode 14 is coupled to the outer or shield lead 50 and the electrode 16 is coupled to the center conductor 52 which is connected to the glass electrode terminal of the meter 54.

In operation, the distributing valve 24 is positioned so that the sample stream flows through the input 28 and output 30 through the capillary 12 and out through the dripper 48. The sample, as it flows through the capillary 12, develops a potential difference between the electrodes 14, 16, which is a function of the charge condition existing in the sample stream. Care should be taken, however, because of the small potential developed across the electrodes by the flow through the capillary, to minimize any error potentials caused by such things as dis-symmetry of the electrodes 14, 16, for example, which may result in output readings which are not a true indication of the charge condition existing in the sample stream.

Care should also be taken to limit the ionic conductivity of the stream to the equivalent conductivity caused by 500 parts per million of sodium chloride in the stream, or less, in order to permit a usable signal to be developed across the electrodes.

When the instrument is to be calibrated, the distribution valve 24 is set to connect input 26 to the input end of the capillary 12, thus substituting a standard sample for the unknown sample from the line 36. Normally, the standard sample is pumped through the capillary (at the same pressure) using pressure regulator 32, as is used to pump the sample from the process stream through the line 36 and the capillary 12. It is customary to run the standard sample through the capillary 20 or 30 seconds before reading the meter 54, in order that an equilibrium condition exist between the sample and the wall of the capillary.

The standard sample may, for example, be a colloidal solution of dispersion wherein the average charge on the particles has previously been determined by other means, such as by a Zeta meter, for example, which measures electrophoretic mobility of charged particles. If calibration over a wide range is desired, various standard samples may be used.

The capillary may be made of polyethylene, polystyrene, nylon, beeswax, paraffin, or polytetrafluoroethylene, or of glass or other ceramic material, for example. One capillary which has been used is composed of a ¾ inch length of ¼ inch diameter polytetrafluoroethylene rod having a hole drilled lengthwise through it with a No. 72 drill (.025 inch diameter).

Alternatives to the capillary 12 may be used. For example, polyethylene tubing having a length of 85 feet and an inner diameter of 3/16 inch has been successfully used. Also, polyethylene tubing having a length of 60 feet and an inner diameter of .062 inch has been successfully used.

The Dynalog type pH meter is very suitable as a potential measuring device with this invention, as memtioned previously, but any millivolt meter having a suitable range and high input impedance may be used as a substitute for it.

It is good practice to provide means for back flushing the filter 42 periodically. Such means may comprise suitable valving arrangements whereby water may be pumped from the output end to the input end of the filter 42 (and thence to a drain, for example), but this type of arrangement is well known to those skilled in the art and is therefore not included in the drawing.

The apparatus heretofore described may be used to indicate the average charge density existing on surfaces present in the sample stream. Typical sample streams may be raw water, sewage, a latex, or oil-water emulsions, for example.

This instrument provides a continuous measurement of the charge condition present in the process stream, whereas prior art instruments such as the so-called Zeta meter, for example, require a considerable period of time and the constant attention of an operator during the time the measurement is made to make a single determination of the charge present on a single particle which is present in a sample of the stream being studied.

In applications where it is desired to produce flocculation of the particles in the stream, the instrument may be used to provide an indication of the end point of a titration operation in which a flocculant material such as alum, ferric chloride, or a suitable polymer such as polyethylenimine, for example, is added to the sample stream as the streaming potential (loosely speaking) is being measured by the instrument of this invention.

The use of the instrument of this invention in batch titration type operation is illustrated in FIG. 2.

Calibrated burettes 60, 62 are disposed with their valved lower ends above a reservoir 64 of distilled water or water of standardized salt content. The contents of the reservoir 64 are coupled to the streaming potential instrument 66 by the line 68 and pump 70 (the line 68 and pump 70 corresponding to line 36 and pump 38 in FIG. 1). As the contents of the reservoir are pumped through the capillary (not shown) of the instrument in FIG. 2, the effluent is recycled through line 72 and dripper 74 to the reservoir 64. For the sake of convenience, a conventional potential recorder 76, adjusted to indicated potential on either side of a neutral point, is coupled to the output of the instrument 66.

In operation, a predetermined amount of a cationic treating material to be analyzed, such as polyethylenimine, for example, is dispensed from the burette 62 into the reservoir 64. Then, with the instrument 66 in operation, discrete amounts of a known standard anionic reagent, such as alkylbenzene sulfonate, are dispensed into the reservoir 64. The amount of anionic reagent required to neutralize the cationic material, as indicated by zero output on the instrument, is recorded. The strength of the cationic material is then conventionally calculated by multiplying the known strength of the anionic material by the volume of the anionic material dispensed into the reservoir 64 and dividing by the volume of the cationic material dispensed into the reservoir 64.

When titrating materials which have charge influencing characteristics, an instrument reading of zero is not always obtained at the equivalence point because of differences in the aggressiveness of the material. Since, in general, the exact deviation of the equivalence point from zero reading to be expected when titrating one material with another will be unknown, the trick of making a second titration right after a first titration is very useful in titrating charge with this instrument. First, an aliquot of sample is titrated to the neutral point or zero millivolts as indicated by the instrument. Then a second aliquot of the same sample is added to the neutral mixture and the composite is titrated. The first titration is ignored and the second is taken as the true titer of the sample.

The procedure described above is useful in quality control operations, for example, in which different batches of product may be compared to determine their relative effectiveness, as in the case of cationic flocculants, for example.

The instrument of this invention may also be used in an overall automatic system for controlling the addition of a treating agent, such as a flocculant, for example, to an aqueous stream of material to be treated. Such a system is disclosed and claimed in our copending application Ser. No. 315,532, now abandoned, filed Oct. 11, 1963 for Control Apparatus and System.

While the capillary 12 and the tubes disclosed as capillary substitutes have been described as being composed of electrically insulating material, it is acknowledged that capillaries having metal inner walls which are very thin may be used. Such metal walled capillaries have such a thin coating of metal that actually, though the walls are not made of insulating material, a high resistance electrical path does exist between the ends of the capillary. Thus, depending on the sensitivity of other equipment of the instrument such a capillary may prove practicable for use in this invention.

It should be remembered, too, that it is important to prevent stray low resistance electrical paths from one of the electrodes to the other. The dripper 48 serves to prevent such stray electrical paths by breaking up the stream of material leaving the flow path into discrete droplets. Alternatively, for example, the material leaving the flow path may pass along or through an elongated discharge passage having electrically insulating walls to provide a leakage path which has a high resistance as compared to the resistance through the flow path between the electrodes.

Although reference is made of flowing material under predetermined pressure through or along the flow path, the actual requirement is a flow rate which equals or exceeds a predetermined amount, e.g., an amount which results in a usable electrical signal being developed across the electrodes. Turbulent flow through or along the flow path results in a less usable signal. Best results have been obtained where lamellar flow occurred as the material flowed along or through the flow path.

What is claimed is:

1. Apparatus for determining the charge condition which is present in a flowable material comprising liquid and particles, comprising a flow path having insulating walls and an input and output, said flow path having means therein for causing the flowable material to develop small electrical potentials, means for measuring small electrical potentials, a pair of spaced apart substantially identical reversible electrodes, said electrodes being coupled to said means for measuring and being disposed in spaced apart relationship along the length of said flow path and adapted to contact the flowable material travelling along said path between said electrodes, whereby small electrical potentials which are developed along said flow path and are a function of the charge density on particles in said flowable materials are applied to said means for measuring potentials, means coupled to the input end of said flow path for flowing said material along said flow path, and means for preventing a low resistance stray electrical path between said spaced apart electrodes externally of said flow path.

2. Apparatus in accordance with claim 1, wherein said flow path is enclosed.

3. Apparatus in accordance with claim 1, wherein said means for preventing a low resistance path is a flow-interrupting device.

4. Apparatus in accordance with claim 1, wherein said means for flowing includes a pump and a back pressure device.

5. Apparatus in accordance with claim 1, wherein said means for causing the flowable material to develop small electrical potentials includes a capillary tube disposed between said electrodes.

6. Apparatus in accordance with claim 1, wherein said flow path is an elongated tube.

7. Apparatus in accordance with claim 1, wherein means are provided for re-cycling said material from the output of said flow path to the input of said flow path.

8. Apparatus in accordance with claim 1, wherein said means for measuring is a recorder device.

References Cited

UNITED STATES PATENTS

| | | | |
|---|---|---|---|
| 1,450,023 | 3/1923 | Edelman | 137—5 |
| 2,108,294 | 2/1938 | Doyle et al. | 204—195.1 |
| 2,615,940 | 10/1952 | Williams. | |
| 2,851,655 | 9/1958 | Haddad | 324—30 |
| 1,794,222 | 2/1931 | Whitney | 137—93 X |
| 1,951,035 | 3/1934 | Parker | 137—93 |
| 2,214,817 | 9/1940 | Harrington | 137—108 X |
| 2,782,151 | 2/1957 | Suthard. | |
| 2,846,489 | 8/1958 | McDonald | 137—5 X |
| 3,032,493 | 5/1962 | Coulson et al. | 204—195 |
| 3,195,982 | 7/1965 | Nicholson | 137—5 X |
| 3,256,902 | 6/1966 | Porter | 137—93 |
| 3,275,533 | 9/1966 | Boronkay | 324—30 X |
| 3,298,944 | 1/1967 | Luck | 204—195 |
| 3,340,471 | 9/1967 | Coulter | 324—30 X |

WILLIAM F. O'DEA, Primary Examiner

DAVID J. ZOBKIW, Assistant Examiner

U.S. Cl. X.R.

73—61; 137—93; 204—195